United States Patent
Tang et al.

(10) Patent No.: US 10,542,140 B1
(45) Date of Patent: Jan. 21, 2020

(54) TELECOMMUNICATIONS SYSTEM

(71) Applicant: THE LIGHT PHONE INC., Brooklyn, NY (US)

(72) Inventors: Kaiwei Tang, Brooklyn, NY (US); Joseph Hollier, Brooklyn, NY (US); David Simmons, Bellevue, WA (US)

(73) Assignee: The Light Phone Inc., Brooklyn, NY (US)

( * ) Notice: Subject to any disclaimer, the term of this patent is extended or adjusted under 35 U.S.C. 154(b) by 0 days.

(21) Appl. No.: 16/406,136

(22) Filed: May 8, 2019

(51) Int. Cl.
| | |
|---|---|
| *H04M 3/42* | (2006.01) |
| *H04M 7/12* | (2006.01) |
| *H04W 12/06* | (2009.01) |
| *H04L 29/06* | (2006.01) |

(52) U.S. Cl.
CPC ... *H04M 3/42263* (2013.01); *H04M 3/42042* (2013.01); *H04M 7/1295* (2013.01); *H04W 12/06* (2013.01); *H04L 63/083* (2013.01); *H04L 2463/082* (2013.01); *H04M 2203/554* (2013.01); *H04M 2203/558* (2013.01)

(58) Field of Classification Search
CPC ......... H04M 3/42263; H04M 3/42042; H04M 7/1295; H04M 2203/554; H04M 2203/558; H04W 12/06; H04L 2463/082; H04L 63/083
USPC ....... 455/414.1, 450, 452.1, 554.1, 555, 557
See application file for complete search history.

(56) References Cited

U.S. PATENT DOCUMENTS

| | | | | |
|---|---|---|---|---|
| 6,614,781 B1* | 9/2003 | Elliott | ......... | H04L 12/6418 370/352 |
| 7,822,188 B1* | 10/2010 | Kirchhoff | ......... | H04M 3/436 379/211.02 |
| 8,880,580 B2* | 11/2014 | Simmons | ......... | G06F 16/188 709/202 |
| 9,277,049 B1* | 3/2016 | Danis | ......... | H04M 3/42042 |
| 2002/0098831 A1* | 7/2002 | Castell | ......... | H04L 51/36 455/413 |
| 2004/0172254 A1* | 9/2004 | Sharma | ......... | A61K 8/411 704/270.1 |
| 2006/0033809 A1* | 2/2006 | Farley | ......... | H04M 3/428 348/14.01 |
| 2006/0168095 A1* | 7/2006 | Sharma | ......... | H04M 3/493 709/217 |
| 2006/0268833 A1* | 11/2006 | Yardley | ......... | H04M 1/2535 370/352 |
| 2007/0027921 A1* | 2/2007 | Alvarado | ......... | G06Q 10/109 |

(Continued)

*Primary Examiner* — Marceau Milord
(74) *Attorney, Agent, or Firm* — Jacob M. Ward; Ward Law Office LLC

(57) ABSTRACT

The telecommunications system of the present disclosure is designed for modern edge scalability to support one-number unification of multiple voice communication devices registered through heterogenous pots, cellular, and VOIP/SIP providers. The system advantageously utilizes only voice or audio services and requiring device data or SMS capabilities for device security verification and call routing management. Within this framework, actual secured device requests for call routing have an overhead limited to approximately a few seconds. The telecommunication system allows a viable service to function well in saturated cellular environments and poor signal scenarios due to prioritization of voice-channels over data and SMS network packets on 2G, 3G, 4G, and next generation cellular technology.

20 Claims, 13 Drawing Sheets

(56) References Cited

U.S. PATENT DOCUMENTS

| | | | | |
|---|---|---|---|---|
| 2007/0233615 | A1* | 10/2007 | Tumminaro | G06Q 20/12 705/75 |
| 2007/0244811 | A1* | 10/2007 | Tumminaro | G06Q 20/10 705/39 |
| 2008/0130554 | A1* | 6/2008 | Gisby | H04M 3/4234 370/328 |
| 2009/0097631 | A1* | 4/2009 | Gisby | H04M 3/46 379/211.02 |
| 2009/0215438 | A1* | 8/2009 | Mittal | H04M 3/42195 455/418 |
| 2010/0182921 | A1* | 7/2010 | Basart | H04L 12/66 370/252 |
| 2010/0220850 | A1* | 9/2010 | Gisby | H04K 1/00 379/211.02 |
| 2011/0096762 | A1* | 4/2011 | Basart | H04L 12/6418 370/338 |
| 2017/0188207 | A1* | 6/2017 | Chien | H04W 76/10 |
| 2018/0014168 | A1* | 1/2018 | Lau | H04M 7/0048 |

* cited by examiner

TELECOMMUNICATIONS SYSTEM

FIELD

The present disclosure relates to a telecommunications system and method and, more particularly, a telecommunications system and method for one-number unification of multiple voice communication devices.

BACKGROUND

Dual-tone multi-frequency (DTMF) signaling is broadly known within the telephonic industry. DTMF systems use a set of eight audio frequencies transmitted in pairs to represent 16 signals, which in turn are used to identify ten digits, the letters A to D, and the symbols pound (#) and asterisk (*).

Since the DTMF signals are audible tones in the voice frequency range, they can be transmitted through electrical repeaters and amplifiers, and over radio and microwave links. This eliminates the need for intermediate operators on long-distance circuits. Typically, these signals are sent over an in-band protocol. In other words, these signals are transmitted over the same communications channel as the primary data.

Modern developments in the telephone industry have led to using out-of-band signaling protocols, in which data signals are sent over a separate data channel. Due to these developments, many core features such as caller identification or caller-id, masking, and call-forwarding, typically utilize these out-of-band signaling protocols.

Unfortunately, these modern practices have led to a problem, namely, latency. Currently, device security verification and call routing management are performed using data or short message service (SMS) capabilities. This has led to poor latency in saturated cellular environments and poor signal scenarios due to prioritization of voice services over data and SMS packets on second-generation (2G) cellular technology and later cellular technologies. This latency causes frustration for users because of the expectation of a near instant connection.

Also, because of the reliance on data and SMS capabilities for device security verification and call routing management, compatibility can be lost between systems that utilize data and SMS and systems that only utilize voice services.

There is a continuing need for a system and method to accomplish call forwarding, masking of caller-id, and one-number unification of multiple voice communication devices registered through heterogenous carrier systems. Desirably, the system and method also minimize the latency associated with known telecommunications systems.

SUMMARY

In concordance with the instant disclosure, a system and method to accomplish call forwarding, masking of caller-id, and one-number unification of multiple voice communication devices registered through heterogenous carrier systems, and which minimize the latency associated with known telecommunications systems, has been surprisingly discovered.

In one embodiment, a telecommunications system includes a primary mobile device, a primary carrier system, a secondary mobile device, a secondary carrier system, a proxy system, a call-handling switch, and a cloud server node. The primary mobile device has a primary phone number and is configured to permit call forwarding. The primary carrier system is in communication with the primary carrier system. The secondary mobile device has a secondary phone number, operates on a second-generation (2G) cellular technology, and is configured to store configuration data and telemetry data. The secondary carrier system is in communication with the secondary mobile device. The proxy system is configuring to be in communication and selectively synchronize with the secondary mobile device to store the configuration data and the telemetry data. The call-handling switch is in communication with the primary carrier system and the secondary carrier system. The cloud server node is in communication with the proxy system and the call-handling switch. The cloud server node has a least one database and is configured to receive and store the secondary mobile device, the configuration data, the telemetry data of the secondary mobile device via the proxy system in the database. Also, the cloud server node is configured to verify, log, and control all communications from the secondary mobile device through the call-handling switch. The cloud server node is further configured to receive and store the primary phone number of the primary mobile device in the database. The configuration data associates the primary phone number of the primary mobile device with the secondary phone number of the secondary mobile device.

In another embodiment, a telecommunications system includes a primary mobile device, a primary carrier system, a secondary mobile device, a secondary carrier system, a call-handling switch, and a cloud server node. The primary mobile device has a primary phone number and is configured to permit call forwarding. The primary carrier system is in communication with the primary carrier system. The secondary mobile device has a secondary phone number, operates on a third-generation (3G) cellular technology or later cellular technology, and is configured to store configuration data and telemetry data. The secondary carrier system is in communication with the secondary mobile device. The call-handling switch is in communication with the primary carrier system and the secondary carrier system. The cloud server node is in communication with the secondary mobile device and the call-handling switch. The cloud server node has a least one database and is configured to directly synchronize with the secondary mobile device without an intervening proxy system and to receive and store the secondary mobile device, the configuration data, the telemetry data of the secondary mobile device in the database. Also, the cloud server node is configured to verify, log, and control all communications from the secondary mobile device through the call-handling switch. The cloud server node is further configured to receive and store the primary phone number of the primary mobile device in the database. The configuration data associates the primary phone number of the primary mobile device with the secondary phone number of the secondary mobile device.

In a further embodiment, a method for performing an outbound call from the secondary mobile device includes the steps of generating an outbound audio signal at the secondary mobile device and communicating the outbound audio signal via the secondary carrier system to the call-handling switch. The outbound audio signal includes a caller-id header with an outbound dual-tone multi-frequency (DTMF) signal. The DTMF signal encodes a caller-id associated with the second phone number of the secondary mobile device. The method next includes a step of communicating the outbound audio signal to the cloud server node from the call-handling switch. The cloud server node converts the outbound DTMF signal to a data signal and correlates the secondary phone number given by the data signal converted from the caller-id header with the primary phone number. Next, the cloud server communicates the primary phone number to the call-handling switch. The call-handling switch then delivers the outbound call to an external device with a caller-id set to the primary phone number instead of the secondary phone number.

In yet another embodiment, a method for performing an inbound call from the external device, which has an external phone number, includes the steps of generating an inbound audio signal at the external device and communicating by the primary carrier system to the call-handling switch the inbound audio signal via a call forwarding setting of the primary mobile device. The inbound audio signal includes a caller-id data signal associated with the external phone number of the external device. Then, the call-handling switch communicates the inbound audio signal to the cloud server node. The cloud server node converts the caller-id data signal to an inbound DTMF signal. Next, the cloud server node communicates the inbound DTMF signal to the call-handling switch. Then, the call-handling switch delivers the inbound audio signal with the inbound DTMF signal to the secondary mobile device. The secondary mobile device is given the external phone number associated with the external device.

Advantageously, and to create a more efficient process relative to the prior art, the present disclosure can encode DTMF headers in-band that contain the caller-id information from an incoming data channel. Also, the present disclosure can convert the DTMF header into a data signal during an outbound call. This allows for the system to be carrier system agnostic, allowing seamless one-number unification across multiple devices and heterogenous systems.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

Figure 12:
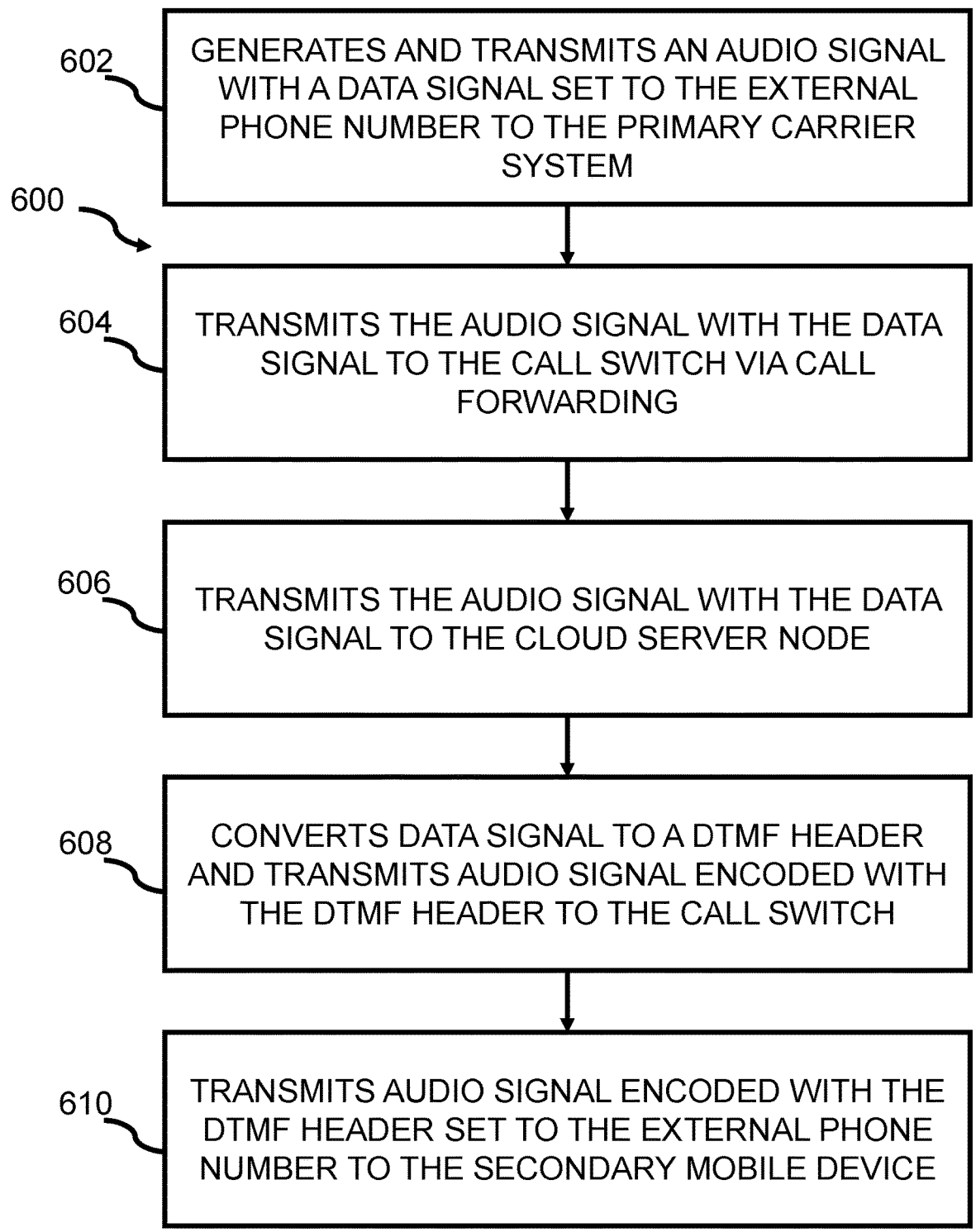
Figure 13:
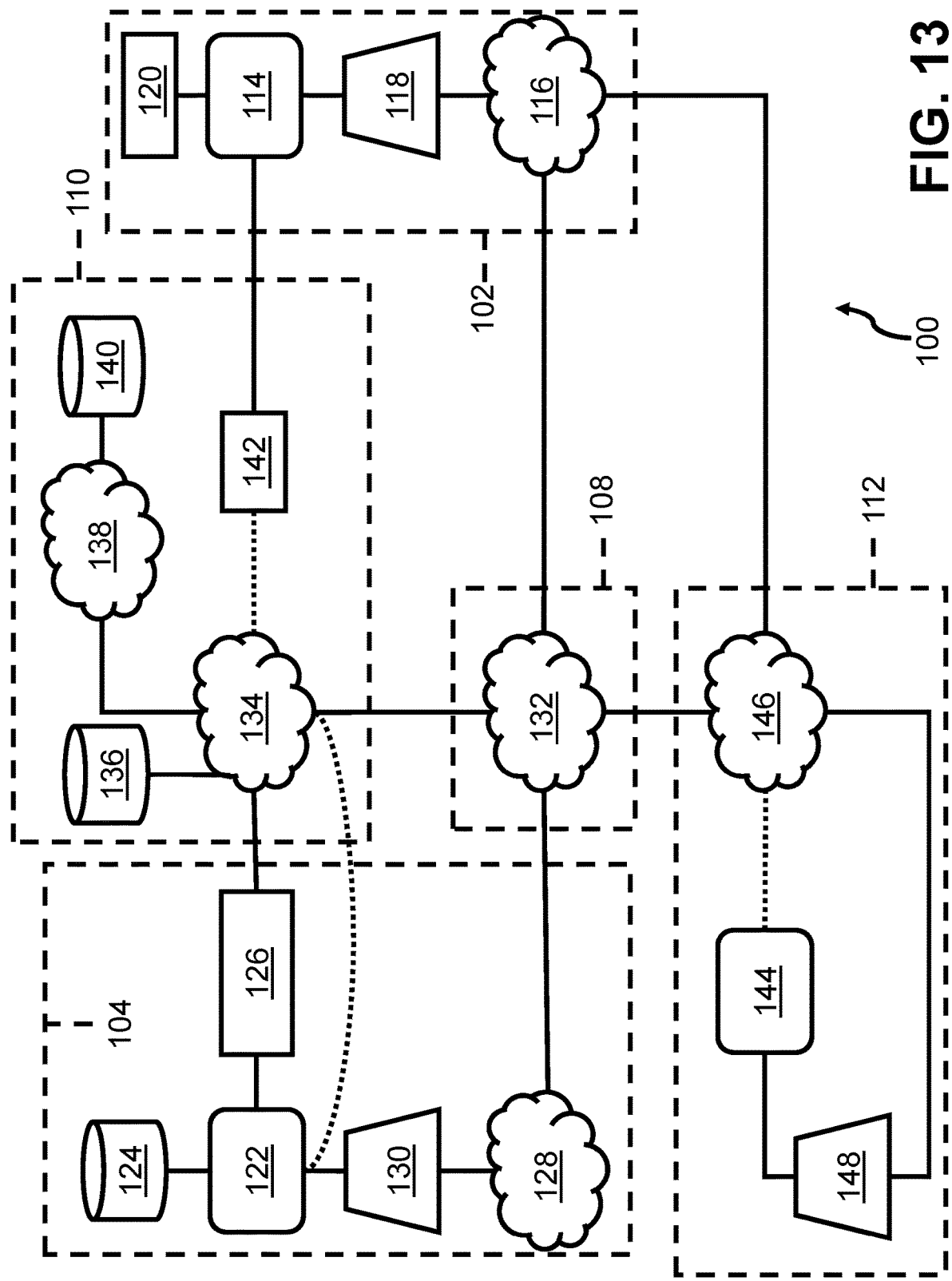

FIG. 12 is a flow chart illustrating a method for performing an inbound call according to one embodiment of the disclosure; and FIG. 13 is a schematic illustrating the telecommunications system according to one embodiment in its entirety, the telecommunications system having the primary device subsystem, the secondary device subsystem, the call-handling switch subsystem, the cloud server subsystem, and the external device subsystem.

DETAILED DESCRIPTION

The following detailed description and appended drawings describe and illustrate various embodiments of the invention. The description and drawings serve to enable one skilled in the art to make and use the invention and are not intended to limit the scope of the invention in any manner. In respect of the methods disclosed, the order of the steps presented is exemplary in nature, and thus, is not necessary or critical unless otherwise disclosed.

A telecommunications system 100 is shown in FIGS. 1-7 and FIG. 13. The telecommunications system 100 includes a primary device subsystem 102, a secondary device subsystem 104, a call-handling switch subsystem 108, a cloud server subsystem 110, and an external device subsystem 112.

Without limiting the system 100 to any particular technology, the various components of the system 100 may include hardware such as one or more processors, memory modules, input/output modules, transceivers, and combinations thereof. The hardware may be configured to communicate with various wide area networks, local area networks, external devices, etc. The memory modules may include one or more random-access memories, read-only memories, disks, application specific integrated circuits, programmable read-only memories, or combinations thereof. The memory modules may store data, applications, and combinations thereof. For example, the memory modules may include tangible, non-transitory, computer readable media that store instructions, which perform particular functionality when executed by one or more processors included in the hardware.

Figure 1:
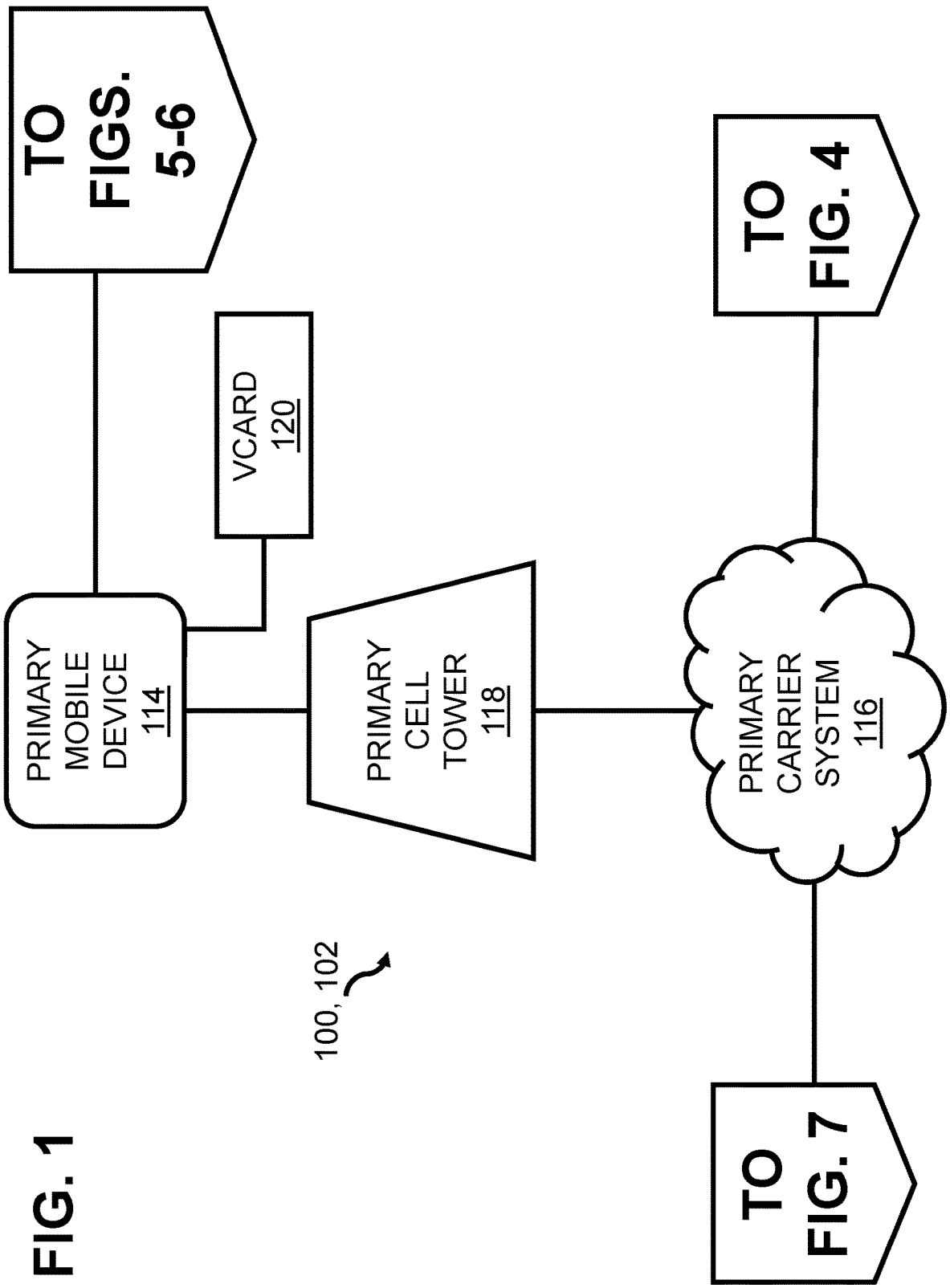
FIG. 1 is a schematic illustrating a primary device subsystem of a telecommunications system according to one embodiment of the disclosure, the primary device subsystem having a primary mobile device.

The primary device subsystem 102 is shown in FIG. 1. The primary device subsystem 102 may include a primary mobile device 114, a primary carrier system 116, a primary cell tower 118, and a virtual contact file or "vCard" 120. The primary mobile device 114 includes a primary phone number and is configured to permit call forwarding. It should be appreciated that the primary phone device 114 can be any "smartphone" that operates on at least a 3G cellular technology or later, as long as it permits call forwarding.

The primary carrier system 116 is in communication with the primary mobile device 114. The primary carrier system 116 may have at least one primary cell tower 118. It should be appreciated that the number of cell towers is scalable, and a skilled artisan may employ any suitable number of cell towers within the scope of the disclosure.

An additional embodiment of the primary carrier system 116 includes a plurality of primary cell towers 118 configured to receive and transmit both data signals and audio signals in the form of voice over Long Term Evolution (voLTE). The primary carrier system 116 is also configured to both receive and transmit the data signals and the audio signals.

The vCard 120 is a virtual contact file that originates from the cloud server subsystem 110. The vCard 120 is discussed in greater detail further herein with respect to the call forwarding process associated with outbound and inbound calls.

Figure 2:
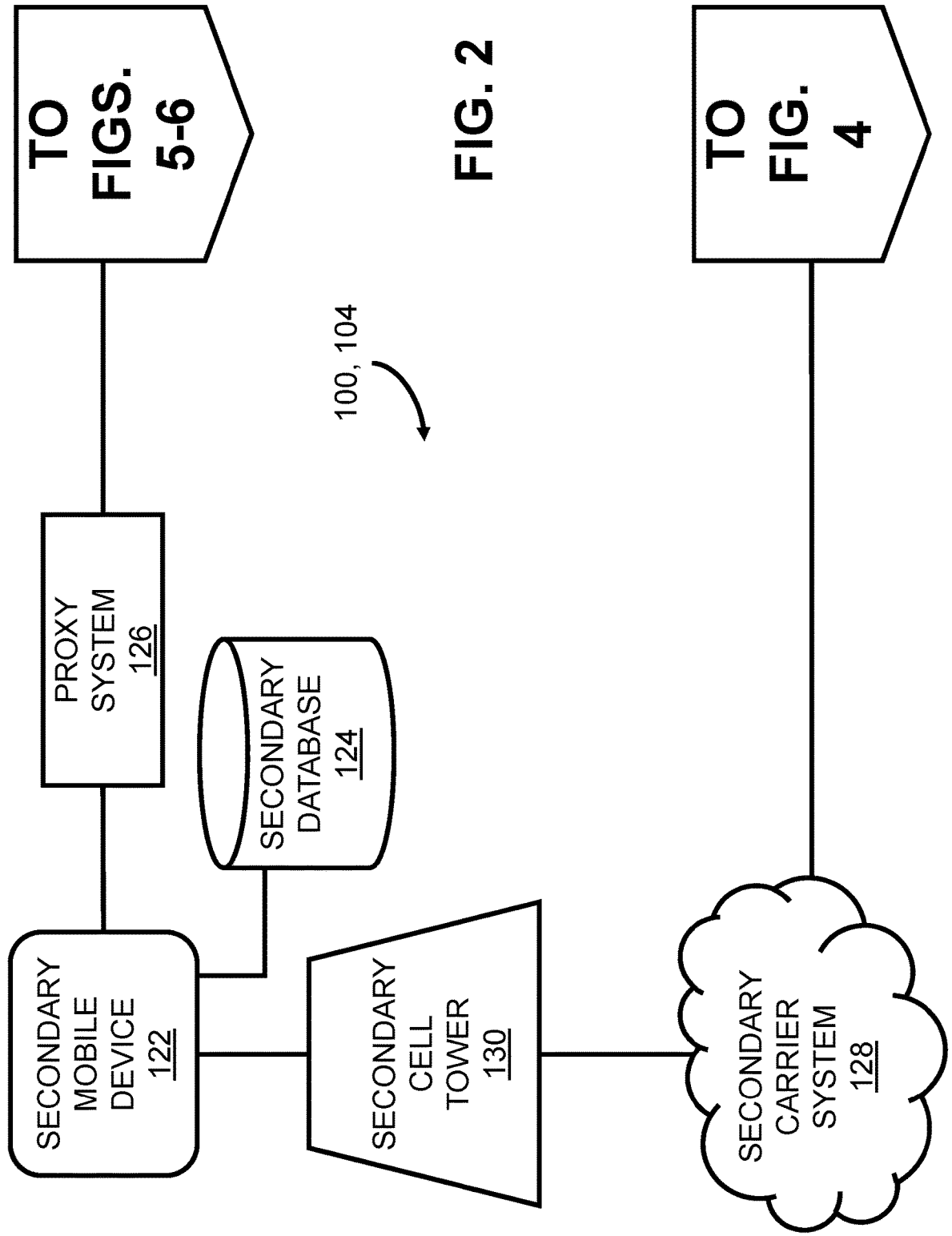
FIG. 2 is a schematic illustrating a secondary device subsystem of the telecommunications system according to one embodiment of the disclosure, the secondary device subsystem having a secondary mobile device and a proxy system.

The secondary device subsystem 104 is shown in FIG. 2. The secondary device subsystem 104 may include a secondary mobile device 122, a secondary database 124, a proxy system 126 a secondary carrier system 128, a secondary cell tower 130.

One embodiment of the secondary mobile device 122 operates on a 2G cellular technology. For example, the secondary mobile device 122 has a secondary phone number and operates exclusively on 2G cellular technology with no Wi-Fi, Bluetooth, and separate data channel. A further embodiment of the secondary mobile device 122 of FIG. 3 operates on fourth generation (4G) cellular technology or later. Other cellular technologies or platforms for the secondary mobile device 122 may also be selected by the skilled artisan within the scope of the present disclosure.

The secondary mobile device 122 is configured to store configuration data and telemetry data in the secondary database 124. The configuration data may include user account information that is sent from the cloud server node subsystem 110. The telemetry data may include records such as the state of the battery, signal strength, and the amount of call failures. Other suitable types of data may be provided in the configuration data and the telemetry data, as desired.

With continued reference to FIG. 2, the proxy system 126 may be an application that runs on a personal computer. The proxy system 126 provides users with means to configure and manage account settings for the secondary mobile device 122. The secondary mobile 122 communicates with the proxy system 126 through a data cable, such as a Universal Serial Bus (USB) cable as one non-limiting example. Other data cables can be employed by a skilled artisan, as desired.

In certain embodiments, the proxy system 126 communicates with the cloud server subsystem 110 via an http web-service internet protocol using the personal computer's internet connectivity. Other suitable means for communication between the proxy system 126 and the cloud server subsystem 110 are contemplated and may also be employed. The proxy system 126 selectively synchronizes configuration and telemetry data between the secondary mobile device 122 and the cloud server subsystem 110. For example, the proxy system 126 may only synchronize where the user connects the secondary mobile device 122 to the proxy system 126 via the data cable.

The secondary carrier system 128 is in communication with the secondary mobile device 122. The secondary system 128 may include at least one secondary cell tower 130. It should be appreciated that the number of cell towers is scalable, and a skilled artisan may employ any suitable number of cell towers within the scope of the disclosure.

Figure 3:
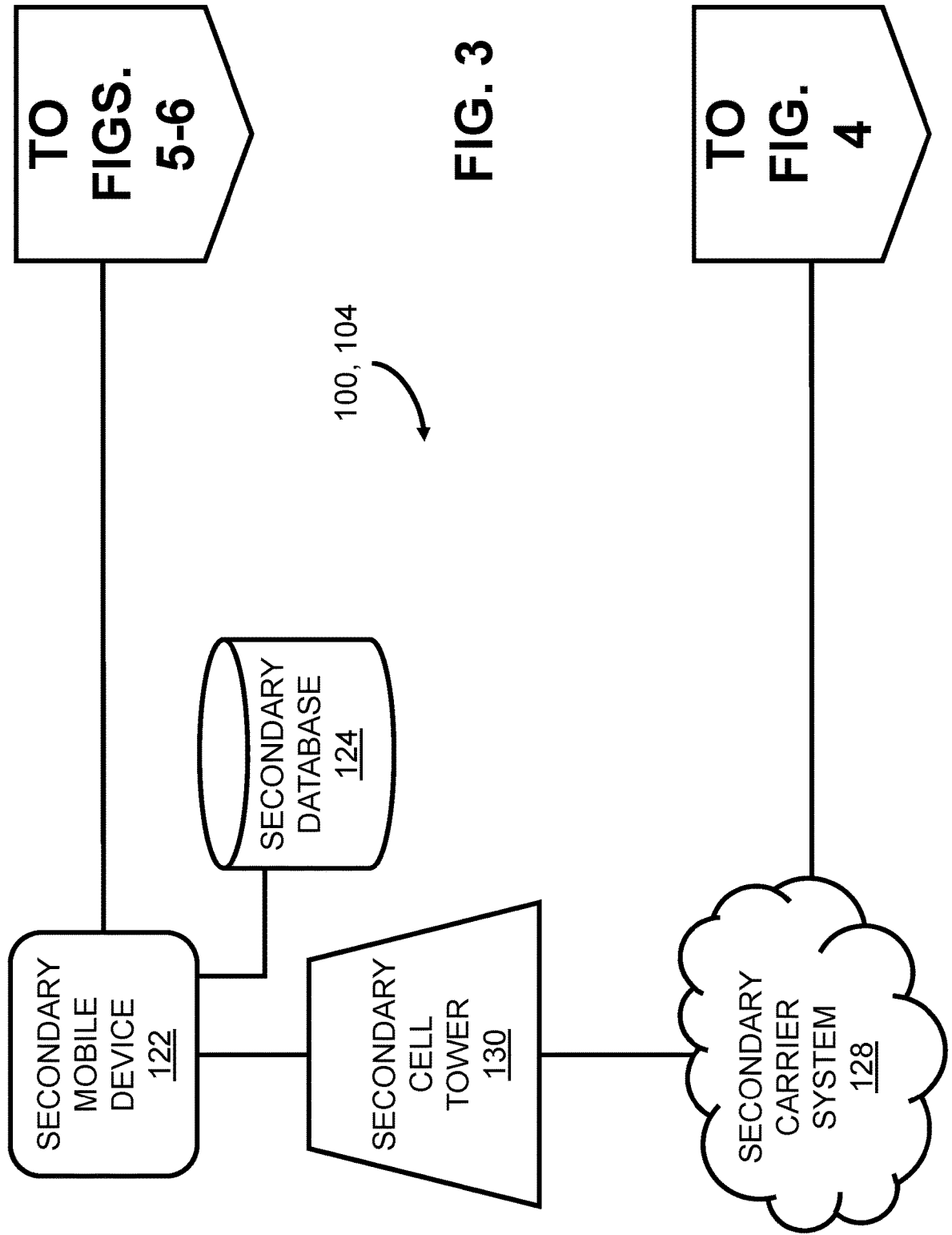
FIG. 3 is a schematic illustrating the secondary device subsystem of the telecommunications system according to another embodiment, the secondary device subsystem shown without the proxy system.

In an alternative embodiment, shown in FIG. 3, the secondary mobile device 122 may be configured to operate on a 3G or later generation cellular technology, and has Wi-Fi and Bluetooth capabilities. In this case, the secondary mobile device 122 may directly synchronize with the cloud server subsystem 110 without an intervening proxy system 126. It should be appreciated that the secondary mobile device 122 being permitted to directly synchronize provides certain advantages, namely, more frequent updates to the configuration and telemetry data files and may generally be more convenient for the user.

In particular embodiments, regardless of whether the secondary mobile device 122 is configured to operate on a 2G cellular technology or later cellular technology, the secondary mobile device 122 of the present disclosure may have a main body with a power button, a speaker, a lock switch, a data cable port for use with the data cable, a microphone, a subscriber identity module (SIM) card port, a display, and a keypad. The display and keypad are providing the form of a backlit plastic wall of the main body. One of ordinary skill in the art may select other suitable structures for the secondary mobile device 122 within the scope of the present disclosure.

Figure 4:
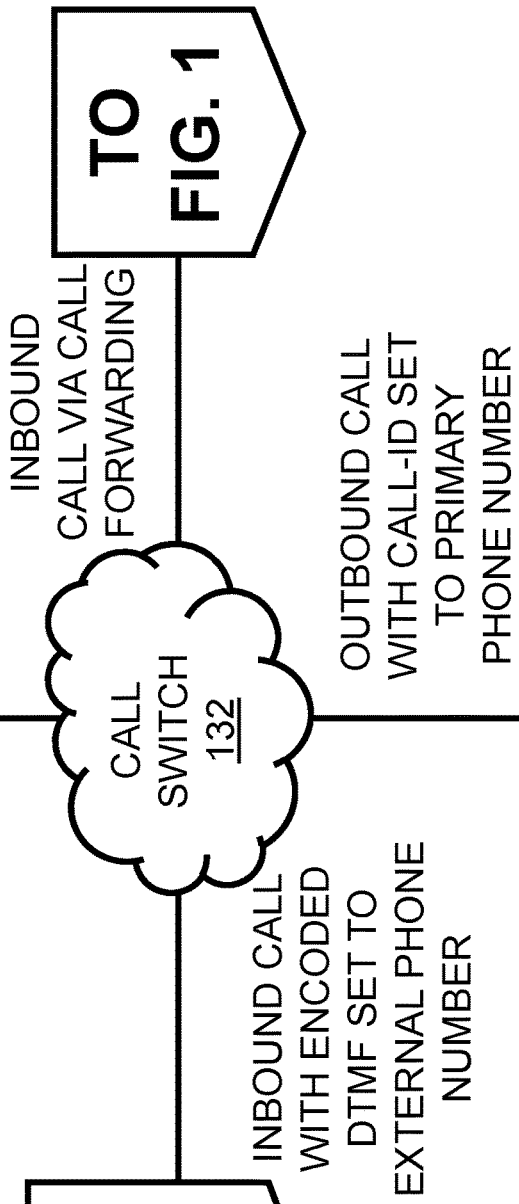
FIG. 4 is a schematic illustrating a call-handling switch subsystem of the telecommunications system, the call-handling switch subsystem in communication with the primary mobile device shown in FIG. 1 and the second mobile device shown in FIGS. 2-3.

The call-handling switch subsystem 108 is shown in FIG. 4. The call-handling switch subsystem 108 may include a call-handling switch 132 that is in communication with the primary carrier system 116 and the secondary carrier system 128. The call-handling switch 132 functions as a telecommunications host system for bridging and switching. It should be appreciated that the call-handling switch 132 handling can be performed using an Internet Protocol private branch exchange (PBX) server, a Voice over Internet Protocol (VoIP) gateway, or Session Initiation Protocol (SIP) trunking. Also, the number of call-handling switches is scalable, and a skilled artisan may employ any suitable number of call-handling switches within the scope of the disclosure.

Figure 5:
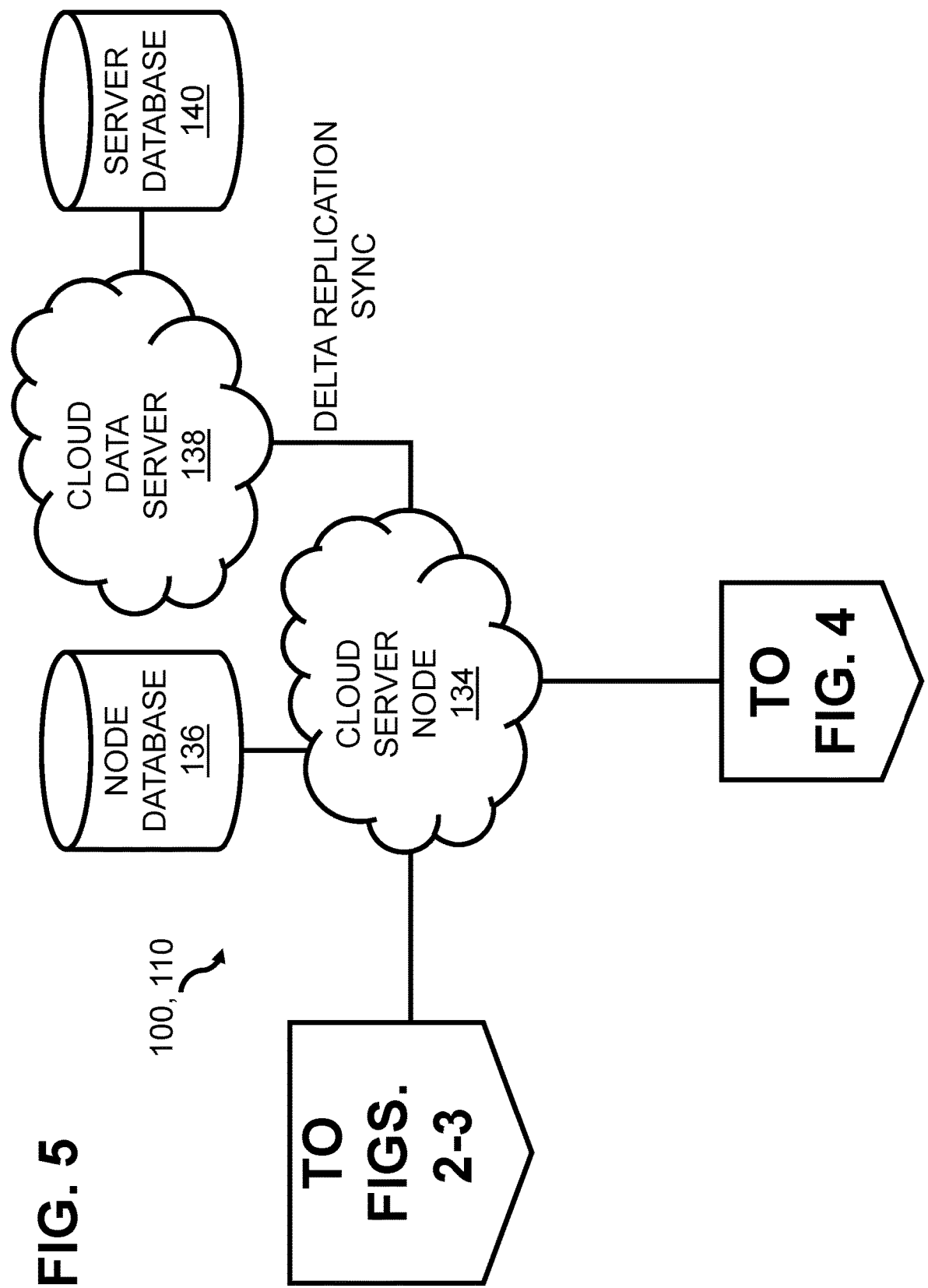
FIG. 5 is a schematic illustrating a cloud server subsystem of the telecommunications system, and showing a cloud server node in communication with the secondary device subsystem shown in FIGS. 2 and 3 and the call-handling switch subsystem shown in FIG. 4.

The cloud server subsystem 110 is shown in FIG. 5. The cloud server subsystem 110 may include a cloud server node 134, a node database 136, a cloud data server 138, and a server database 140.

The cloud server node 134 is in communication with the proxy system 126 and the call-handling switch 132 and the node database 136. The cloud server node 134 is configured to receive and store the secondary phone number, the configuration data, and the telemetry data of the secondary mobile device 122 in the node database 136. This can be done via the proxy system 126 or, in some embodiments, directly via the secondary mobile device 122.

The cloud server node 134 is configured to receive and store the primary phone number of the primary mobile device 114 in the node database 136. The configuration data in the node database 136 further includes an association of the primary phone number of the primary mobile device 114 with the secondary phone number of the secondary mobile device 122. The cloud server node 134 is also configured to verify, log, and control all communications from the secondary mobile device 122 through the call-handling switch 132. It should be appreciated that the number of server nodes is scalable, and a skilled artisan may employ any suitable number of server nodes within the scope of the disclosure.

An additional embodiment of the cloud server node 134 includes a fuzzy algorithm module (not shown). The fuzzy algorithm module may be configured to receive at least a portion of an outbound DTMF signal and convert the portion to the data signal for the correlation with the primary phone number. One of ordinary skill in the art may use any suitable fuzzy algorithm for use in correlating the portion of the data signal with the primary phone number, as desired.

The node database 136 may further contain current user accounts, telemetry data, call-handling switch telemetry data, warehouse sync data, and configuration and provisioning data for that node. Other types of data and information are contemplated and may also be stored within the node database 136.

With continued reference to FIG. 5, the cloud data server 138 is in communication with the cloud server node 134. The cloud data server 138 is configured to perform routine delta-level replication synchronization, which is byte replication technology that enables block/byte level synchronization, to ensure adequate backups to the server database 140. A skilled artisan may employ any suitable methods of backing up data within the scope of the disclosure. Also, it should be appreciated that the number of server databases is scalable, and a skilled artisan may employ any suitable number of server databases, as desired.

Figure 6:
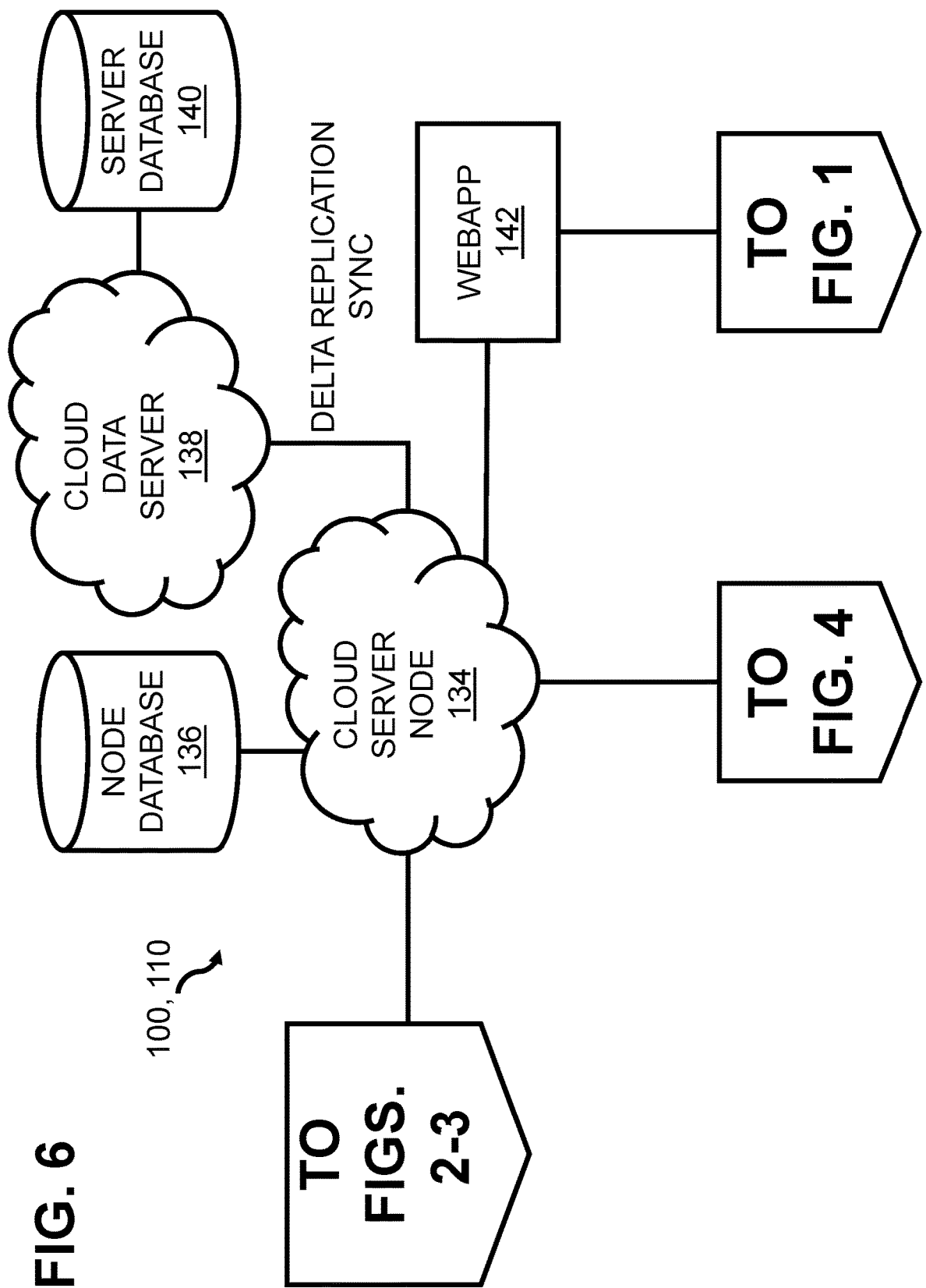
FIG. 6 is a schematic illustrating the cloud server subsystem of the telecommunications system according to another embodiment, and further showing a web application in communication with the cloud server node and the primary device subsystem of FIG. 1.

In an alternative embodiment, shown in FIG. 6, the cloud server subsystem 110 includes a web application 142 that is in communication with the cloud server node 134 and the primary mobile device 114. The web application 142 is a client-server computer program runs in a web browser. The web application 142 permits a user to manage the configuration data of the secondary mobile device 122 such as the user account information and direct dial numbers. It should be appreciated that the use of the web application 142 may have certain advantages relative to use of the proxy system 126, namely, more convenient maintenance of data by the user by logging into the web application 142 via the web browser. It should be appreciated that any number of data values may be configurable by the user, and a skilled artisan may employ any suitable number within the scope of the disclosure.

In some examples, the web application 142 is selectively accessible via the internet browser of the primary mobile device 114. In further examples, the web application 142 is a progressive web application. Progressive web applications load in a manner similar to regular web pages or websites but offer the user additional functionality. Some non-limiting additional functionality include working offline or push notifications to the "smartphone" devices.

Figure 7:
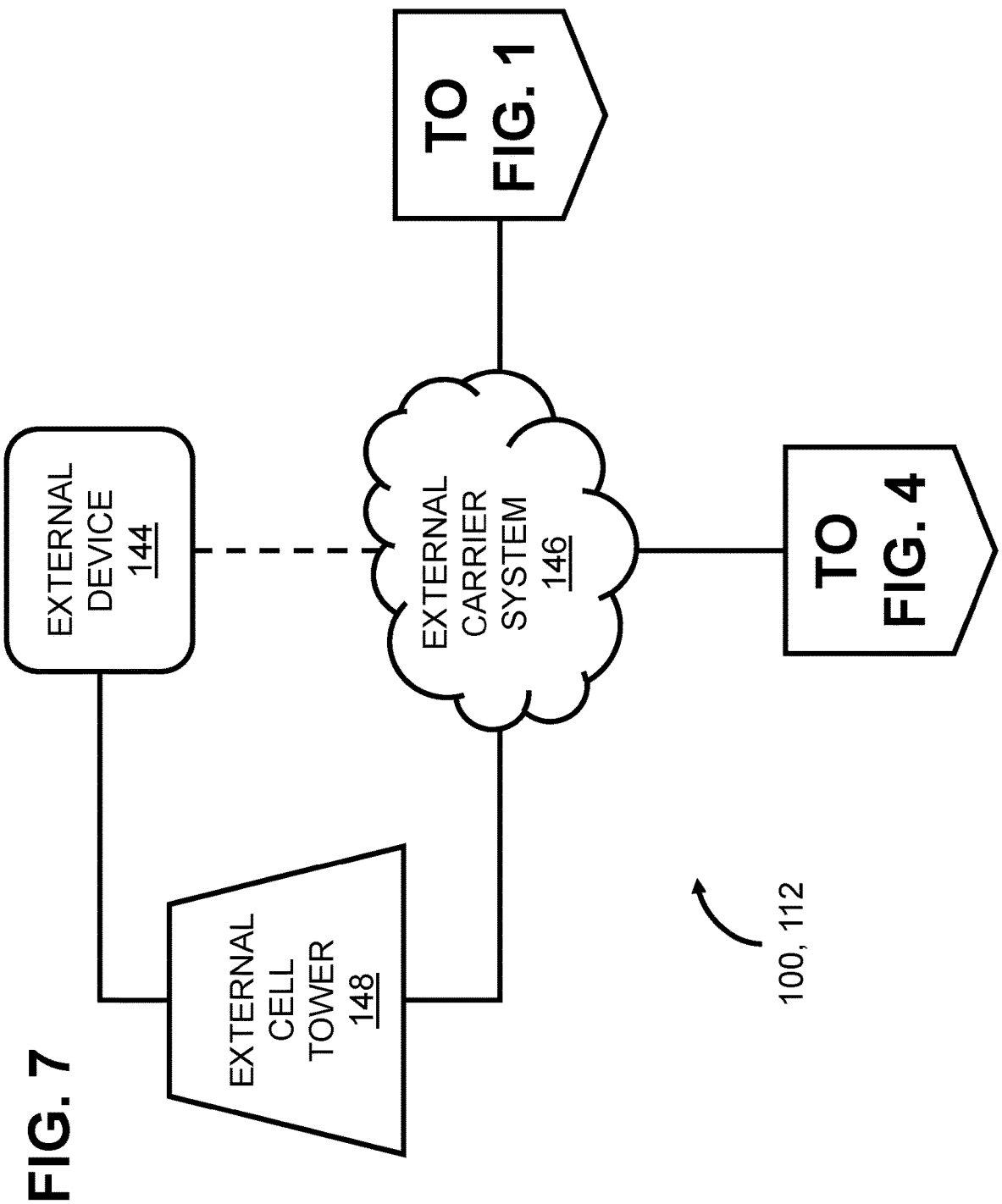
FIG. 7 is a schematic illustrating an external device subsystem of the telecommunications system, and showing an external carrier system in communication with the primary device subsystem of FIG. 1 and the call-handling switch subsystem of FIG. 4.

With reference to FIG. 7, the external device subsystem 112 is shown. The external device subsystem 112 may include an external device 144, an external carrier system 146, and an external cell tower 148. The external device 144 has an external phone number. It should be appreciated that the external device 144 can be a "smartphone," a personal computer using VoIP, or a plain old telephone system (POTS).

The external carrier system 146 is in communication with the primary carrier system 116 and the call-handling switch 132. The external carrier system 146 may have at least one external cell tower 148. It should be appreciated that the number of cell towers is scalable, and a skilled artisan may employ any suitable number of cell towers within the scope of the disclosure.

An additional embodiment of the external carrier system 146 includes a plurality of external cell towers 148 configured to receive and transmit both data signals and audio signals in the form of voice of Long Term Evolution (voLTE). The external carrier system 146 is also configured to both receive and transmit the data signals and the audio signals.

Figure 8:
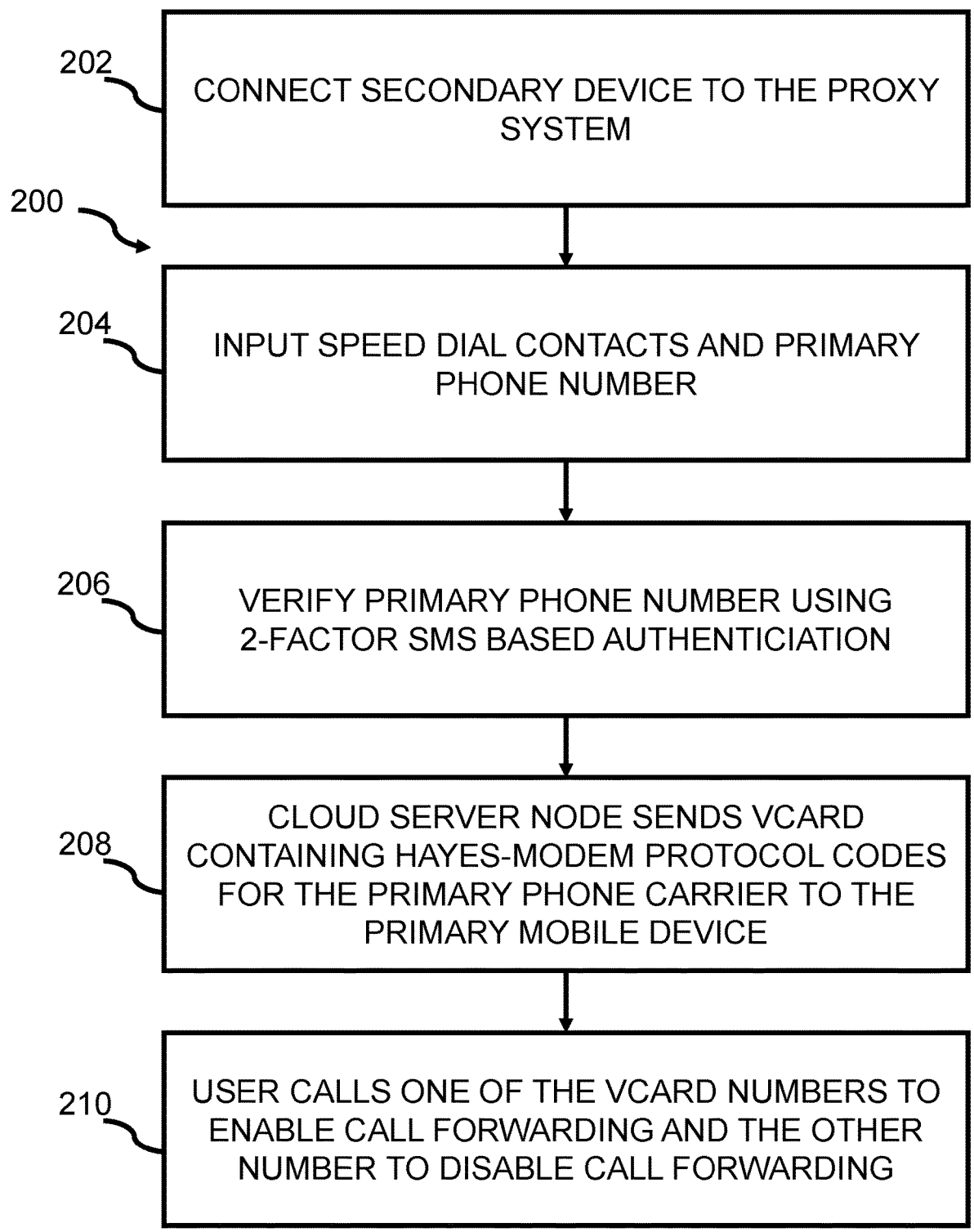
FIG. 8 is a flow chart illustrating a pairing and setup method of the primary mobile device and the secondary mobile device according to one embodiment of the disclosure, the method using a proxy system.

Referring now to FIG. 8, a pairing and setup method 200 of the secondary mobile device 122 and the primary mobile device 114 is shown. This process starts by placing the secondary mobile device 122 in communication with the proxy system 126, for example, by connection via the data cable, in a step 202. Using the proxy system 126, the user inputs speed dial contacts for use with the secondary mobile device 122 and the primary phone number of the primary mobile device 114 in a step 204. Once that data has been provided, the user verifies the primary phone number entered via 2-factor SMS based authentication in a step 206.

The cloud server node 134 accomplishes the 2-factor SMS based authentication by providing a personal identification number (PIN) to the user via the proxy system 126 and sending a SMS message to the primary mobile device 114. The user responds to the SMS message via a SMS message with the provided PIN. This verifies the primary mobile number with the cloud server node 134 and allows the primary mobile device 114 to communicate with the call-handling switch 132.

After the verification, the cloud server node 134 configures and transmits the vCard 120 to the primary mobile device 114 in step 208. The vCard 120 may contain Hayes-modem protocol codes customized to the primary carrier system 116, in order to allow the user to manage the call forwarding setting of the primary mobile device 114. This takes the form of two telephone numbers stored in the vCard 120. The first number allows the user to enable call forwarding upon calling the first number. The second number allows the user to disable call forwarding upon calling the second number.

Once the user saves the vCard 120 to a memory of the primary mobile device 114, the user can selectively enable and disable call forwarding by calling the first number to enable call forwarding and calling the second number to disable call forwarding in a step 210. It should be appreciated that the use of the vCard 120 in this manner provides for a simple and convenient means for the user to manage whether the call forwarding is enabled or disabled.

Figure 9:
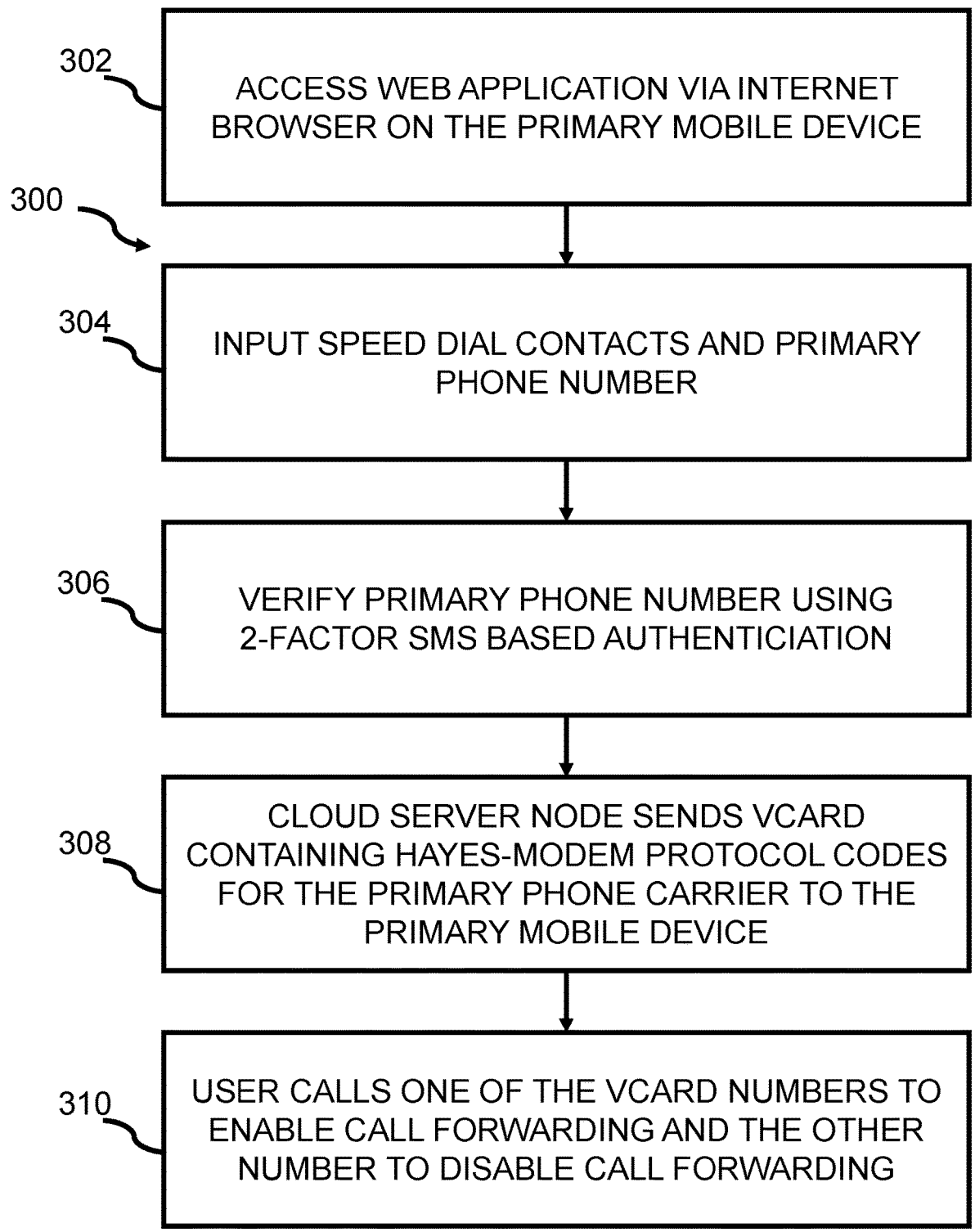
FIG. 9 is a flow chart illustrating the pairing and setup method of the primary mobile device and the secondary mobile device according to a further embodiment of the disclosure, the method using a web application.

An alternate embodiment of the pairing and setup process 300 is shown in FIG. 9. The method 300 is similar to method 200, with the exception that the web application 142 is used instead of the proxy system 126. It should be understood that this may be more convenient for the user, because it allows the user to input the speed contacts and primary phone number in step 304 via the web application 142 instead of having to connect the secondary mobile device 122 to the proxy system 126.

In some instances, the web application 142 can be accessed directly through the web browser of the primary mobile device 114. This conveniently allows the user to access account management solely from their primary mobile device 114.

Figure 10:
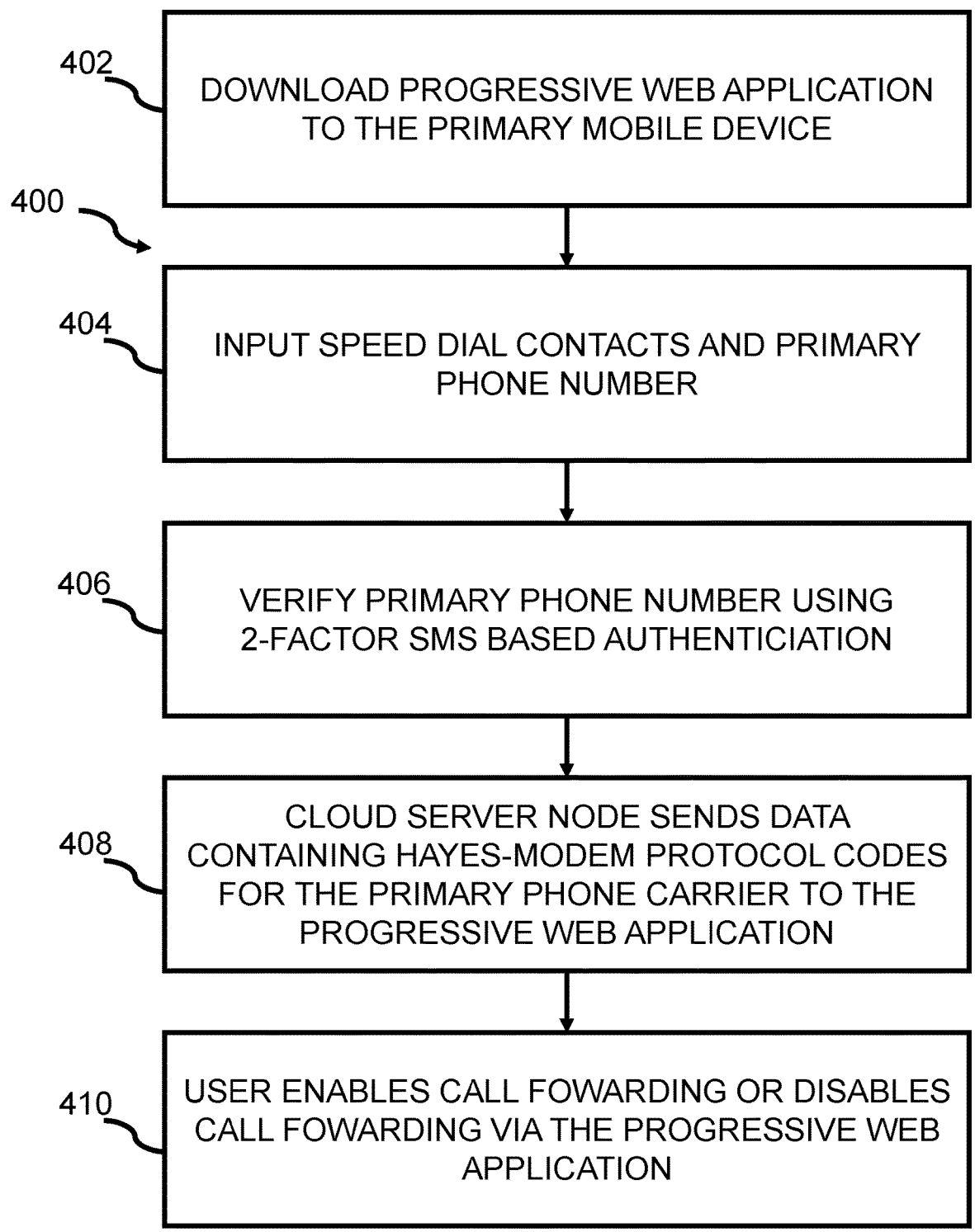
FIG. 10 is a flow chart illustrating the pairing and setup method of the primary mobile device and the secondary mobile device according to yet another embodiment of the disclosure, the method using a progressive web application.

As shown in FIG. 10, the pairing and setup process may include a method 400. The method 400 differs from method 200 and method 300 by the web application 142 being a progressive web application, which also advantageously functions as a replacement for the vCard 120. The progressive web application is even more convenient for the user, because it allows the user to input the speed contacts and the primary phone number via the application and also allows the user to directly enable or disable the call forwarding via the application.

In operation, the telecommunications system 100 of the present disclosure may be used in both a method 500 for making outbound calls (shown in FIG. 11) and a method 600 for receiving inbound calls (shown in FIG. 12).

Figure 11:
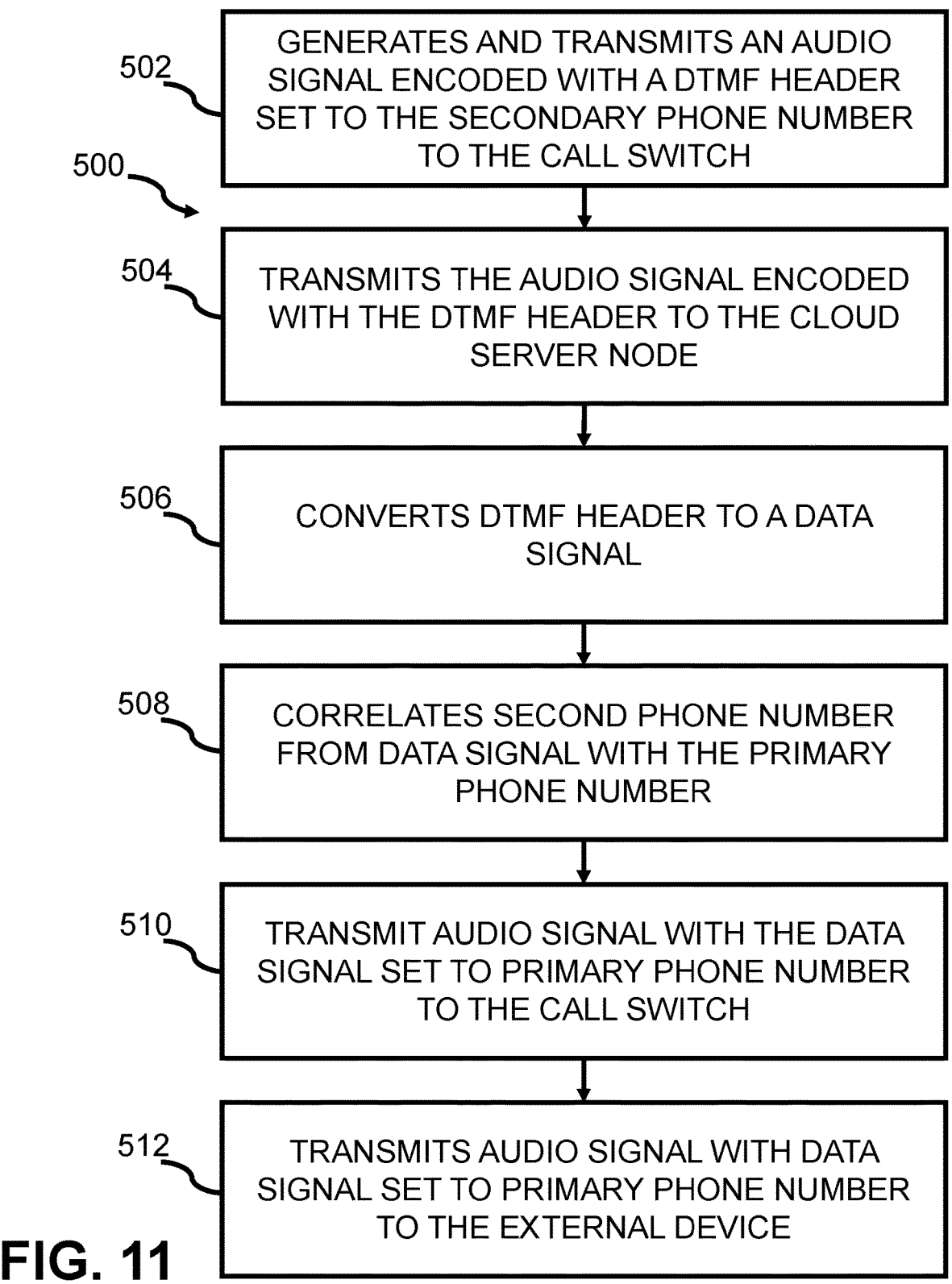
FIG. 11 is a flow chart illustrating a method for performing an outbound call according to one embodiment of the disclosure.

Referring to FIG. 11, the method 500 allows the secondary mobile device 122 to perform an outbound call to the external device 144. In a step 502, this process begins by the secondary mobile device 122 generating and transmitting an audio signal, encoded with a caller-id header via DTMF, to the call-handling switch 132. The caller-id header in this case is normally set to the secondary phone number of the secondary mobile device 122. The caller-id header via DTMF is in-band with the audio signal.

The call-handling switch 132 next relays the audio signal encoded with the DTMF header to the cloud server node 134 in a step 504. Then, the cloud server node 134 converts the DTMF header to a data signal in a step 506. The data signal functions as the caller-id for the outbound call and is based upon the secondary phone number. The data signal is then correlated in a step 508 by the cloud server node 134 with one of the primary phone numbers stored in the node database 136, which was paired with the secondary phone number via methods 200, 300, or 400.

As previously mentioned, some embodiments of the cloud server node 134 have the fuzzy algorithm module that allows the cloud server node 134 to only require a portion of the outbound audio signal encoded with the DTMF in order to perform the correlation. The fuzzy algorithm is able to compare and make an approximation of what the full audio signal would have contained had the entirety of the audio signal been received. With this approximated audio signal, the cloud server node 134 converts the approximated audio signal into a data signal. The data signal functions as the caller-id for the outbound call and is then correlated with the primary phone number that was earlier paired with the secondary phone number via methods 200, 300, or 400

In further embodiments, the DTMF header is salted with a security sequence. This salting allows the fuzzy algorithm to make better approximated audio signals even when one or more digits of the outbound signal with the DTMF header are not received. The salting may otherwise be performed according to salting techniques known to those skilled in the art.

With continued reference to FIG. 11, the cloud server node 134 then transmits the audio signal with the data signal to the call-handling switch 132 in a step 510, whereby the caller-id is set to the primary phone number of the primary mobile device 114. Once the call-handling switch 132 receives the audio signal with the data signal set to the primary phone number, the call-handling switch 132 transmits the signal to the external device 144 in a step 512.

It should be appreciated that the method 500 advantageously allows one-number unification between the secondary mobile device 122 and the primary mobile device 114 because the external device 144 only displays the primary phone number of the primary mobile device 114 on the caller-id, despite the secondary mobile device 122 having a secondary number and being part of a of separate heterogenous systems.

Referring to FIG. 12, the method 600 allows the secondary mobile device 122 to receive the inbound call from the external device 144. This process starts by the external device 144 generating and transmitting an audio signal with a data signal to the primary carrier system 116 in a step 602. The data signal containing the caller-id set to the external phone number of the external device 144.

Next, if the user has enabled call forwarding via the methods 200, 300, or 400, the primary carrier system 116 relays the audio signal with the data signal to the call-handling switch 132 in a step 604. Then, the call-handling switch 132 transmits the audio signal with the data signal to the cloud server node 134 in a step 606.

Thereafter, the cloud server node 134 converts the audio signal with the data signal into an audio signal encoded with a DTMF header set to the external phone number and transmits it to the call-handling switch 132 in a step 608. Once the call-handling switch 132 receives the audio signal encoded with the DTMF header, the call-handling switch 132 transmits it to the secondary mobile device 122.

The method 600 further allows users to have one-number unification between the secondary mobile device 122 and the primary mobile device 114. Users of the external device 144 only have to use the primary phone number because it forwards the calls to the secondary mobile device 122 despite the call being transmitted to the secondary mobile device 122 that has a secondary number and is a part of separate heterogenous systems.

Advantageously, the telecommunications system 100 and methods 200, 300, 400, 500 described hereinabove accomplish call forwarding, masking of caller-id, and one-number unification of multiple voice communication devices registered through heterogenous carrier systems. It is also believed that the telecommunications system 100 and methods 200, 300, 400, 500 minimize the latency issues that are otherwise associated with associated with known telecommunications systems.

While certain representative embodiments and details have been shown for purposes of illustrating the invention, it will be apparent to those skilled in the art that various changes may be made without departing from the scope of the disclosure, which is further described in the following appended claims.

What is claimed is:

1. A telecommunications system, comprising:
    a primary mobile device with a primary phone number, the primary mobile device configured to permit call forwarding;
    a primary carrier system, the primary mobile device in communication with the primary carrier system;
    a secondary mobile device with a secondary phone number, the secondary mobile device operating on a second-generation (2G) cellular technology, the secondary mobile device configured to store configuration data and telemetry data;
    a secondary carrier system, the secondary mobile device in communication with the secondary carrier system;
    a proxy system configured to be in communication with the secondary mobile device, and to selectively synchronize with the secondary mobile device to store the configuration data and the telemetry data;
    a call-handling switch in communication with each of the primary carrier system and the secondary carrier system; and
    a cloud server node in communication with the proxy system and the call-handling switch, the cloud server node having at least one database, the cloud server node configured to receive and store the secondary phone number, the configuration data, and the telemetry data of the secondary mobile device via in the data base via the proxy system, and to verify, log, and control all communications from the secondary mobile device through the call-handling switch, and the cloud server node also configured to receive and store the primary phone number of the primary mobile device in the database, the configuration data including an association of the primary phone number of the primary mobile device with the secondary phone number of the secondary mobile device, wherein, during an outbound call from the secondary mobile device, an outbound audio signal is generated at the secondary mobile device and communicated via the secondary carrier system to the call-handling switch, the outbound audio signal including a caller-id header with an outbound dual-tone multi-frequency (DTMF) signal encoding a caller-id associated with the second phone number of the secondary mobile device, and the call-handling switch communicates the outbound audio signal to the cloud server node, and the cloud server node converts the outbound DTMF signal to a data signal and correlates the secondary phone number given by the data signal converted from the caller-id header with the primary phone number, and the cloud server node communicates the primary phone number to the call-handling switch, and the call-handling switch delivers the outbound call to an external device, whereby the external device is given a caller-id set to the primary phone number instead of the secondary phone number, and wherein, during an inbound call from the external device with an external phone number, an inbound audio signal is generated at the external device and communicated by the primary carrier system to the call-handling switch via a call forwarding setting of the primary mobile device, the inbound audio signal including a caller-id data signal associated with the external phone number of the external device, and the call-handling switch communicates the inbound audio signal to the cloud server node, and the cloud server node converts the caller-id data signal to an inbound DTMF signal, and the cloud server node communicates the inbound DTMF signal to the call-handling switch, and the call-handling switch delivers the inbound audio signal with the inbound DTMF signal to the secondary mobile device, whereby the secondary mobile device is given the external phone number associated with the external device.

2. The telecommunications system of claim 1, wherein the primary mobile device operates on a third-generation (3G) cellular technology or later generation cellular technology.

3. The telecommunications system of claim 1, wherein the primary carrier system includes a plurality of cell towers configured to receive and transmit both data signals and audio signals in the form of voice over Long Term Evolution (voLTE), and the primary carrier system is configured to both receive and transmit the data signals and the audio signals.

4. The telecommunications system of claim 1, wherein the secondary mobile device is configured to be placed in communication with the proxy system via a data cable.

5. The telecommunications system of claim 4, wherein the secondary mobile device is operating on 2G and has a main body with a power button, a speaker, a lock switch, a data cable port for use with the data cable, a microphone, a subscriber identity module (SIM) card port, a display, and a keypad, and wherein the display and the keypad are providing the form of a backlit plastic wall of the main body.

6. The telecommunications system of claim 1, wherein the secondary carrier system is configured to both receive and transmit audio signals, but not receive and transmit data signals including 4G data.

7. The telecommunications system of claim 1, wherein the proxy system is in communication with the cloud server node via http web-service internet protocols.

8. The telecommunications system of claim 1, wherein the cloud server node may be accessed via an internet application for management of the configuration data of the secondary mobile device, the configuration data including user account information, and direct dial numbers.

9. The telecommunications system of claim 8, wherein the primary mobile device is in selective communication with the cloud server node via the internet application.

10. The telecommunications system of claim 9, wherein the primary mobile device has an associated virtual card (vCard) that is configured and delivered to the primary mobile device by the cloud server node, the vCard containing Hayes-modem protocol codes customized to the primary carrier to manage the call forwarding setting of the primary mobile device.

11. The telecommunications system of claim 10, wherein the vCard permits for a selective engaging or disengaging of the call forwarding of the primary mobile device to the secondary mobile device, the vCard including a first number to enable the call forwarding and a second number to disable the call forwarding.

12. The telecommunications system of claim 1, further comprising a cloud data server in communication with the cloud server node, the cloud data server having a plurality of databases and performing a delta-level replication synchronization with the cloud server node.

13. The telecommunications system of claim 1, further comprising an external carrier system in communication with both the call-handling switch and the external phone.

14. The telecommunications system of claim 13, wherein the external carrier system includes a plurality of cell towers configured to receive and transmit both data signals and audio signals in the form of voice over Long Term Evolution (voLTE), and the external carrier system is configured to both receive and transmit the data signals and the audio signals.

15. The telecommunications system of claim 1, wherein the cloud server node has a fuzzy algorithm module, the fuzzy algorithm module configured to receive at least a portion of the outbound DTMF signal and convert the portion to the data signal for the correlation with the primary phone number.

16. The telecommunications system of claim 15, wherein the outbound DTMF signal is further salted with a security sequence that permits for the recognition by the cloud server node of the portion of the outbound DTMF signal even where one or more digits of the outbound DTMF signal are not received.

17. The telecommunications system of claim 1, wherein there is a 2-factor, SMS-based authentication for pairing that permits the communication between the call-handling switch and the primary carrier system.

18. A telecommunications system, comprising:
 a primary mobile device with a primary phone number, the primary mobile device configured to permit call forwarding;

a primary carrier system, the primary mobile device in communication with the primary carrier system;

a secondary mobile device with a secondary phone number, the second mobile device operating on the third-generation (3G) cellular technology or later generation cellular technology, the secondary mobile device configured to store configuration data and telemetry data;

a secondary carrier system, the secondary mobile device in communication with the secondary carrier system;

a call-handling switch in communication with each of the primary carrier system and the secondary carrier system; and a cloud server node in communication with the secondary mobile device and the call-handling switch, the cloud server node having at least one database, the cloud server node configured to directly synchronize with the secondary mobile device without an intervening proxy system, the cloud server node configured to receive and store the secondary phone number, the configuration data, and the telemetry data of the secondary mobile device in the database, and to verify, log, and control all communications from the secondary mobile device through the call-handling switch, and the cloud server node also configured to receive and store the primary phone number of the primary mobile device in the database, the configuration data including an association of the primary phone number of the primary mobile device with the secondary phone number of the secondary mobile device, wherein, during an outbound call from the secondary mobile device, an outbound audio signal is generated at the secondary mobile device and communicated via the secondary carrier system to the call-handling switch, the outbound audio signal including a caller-id header with an outbound dual-tone multi-frequency (DTMF) signal encoding a caller-id associated with the second phone number of the secondary mobile device, and the call-handling switch communicates the outbound audio signal to the cloud server node, and the cloud server node converts the outbound DTMF signal to a data signal and correlates the secondary phone number given by the data signal converted from the caller-id header with the primary phone number, and the cloud server node communicates the primary phone number to the call-handling switch, and the call-handling switch delivers the outbound call to an external device, whereby the external device is given a caller-id set to the primary phone number instead of the secondary phone number, and wherein, during an inbound call from the external device with an external phone number, an inbound audio signal is generated at the external device and communicated by the primary carrier system to the call-handling switch via a call forwarding setting of the primary mobile device, the inbound audio signal including a caller-id data signal associated with the external phone number of the external device, and the call-handling switch communicates the inbound audio signal to the cloud server node, and the cloud server node converts the caller-id data signal to an inbound DTMF signal, and the cloud server node communicated the inbound DTMF signal to the call-handling switch, and the call-handling switch delivers the inbound audio signal with the inbound DTMF signal to the secondary mobile device, whereby the second mobile device is given the external phone number associated with the external device.

19. The telecommunications system of claim 18, wherein the secondary mobile device is operating on 4G and has a main body with a power button, a speaker, a lock switch, a microphone, a subscriber identity module (SIM) card port, a display, and a keypad, and wherein the display and the keypad are providing the form of a backlit plastic wall of the main body, and wherein the secondary mobile device further has WiFi and Bluetooth transceivers.

20. A method for using a telecommunications system, the telecommunications system including a primary mobile device, a primary carrier system, a secondary mobile device, a secondary carrier system, a call-handling switch, and a cloud server node, the primary mobile device having a primary phone number, the primary mobile device configured to permit call forwarding, the primary mobile device in communication with the primary carrier system, the secondary mobile device having a secondary phone number, the secondary mobile device operating on a second-generation (2G) cellular technology, the secondary mobile device configured to store configuration data and telemetry data, the secondary mobile device in communication with the secondary carrier system, the call-handling switch in communication with each of the primary carrier system and the secondary carrier system, and the cloud server node in communication with the call-handling switch, the cloud server node having at least one database, the cloud server node configured to receive and store the secondary phone number, the configuration data, and the telemetry data of the secondary mobile in the database and to verify, log, and control all communications from the secondary mobile device through the call-handling switch, and the cloud server node also configured to receive and store the primary phone number of the primary mobile device in the database, the configuration data including an association of the primary phone number of the primary mobile device with the secondary phone number of the secondary mobile device, the method comprising the steps of:

at least one of a) during an outbound call from the secondary mobile device, i) generating an outbound audio signal at the secondary mobile device;

ii) communicating the outbound audio signal via the secondary carrier system to the call-handling switch, the outbound audio signal including a caller-id header with an outbound dual-tone multi-frequency (DTMF) signal encoding a caller-id associated with the second phone number of the secondary mobile device;

iii) communicating, by the call-handling switch, the outbound audio signal to the cloud server node;

iv) converting, by the cloud server node, the outbound DTMF signal to a data signal and correlating the secondary phone number given by the data signal converted from the caller-id header with the primary phone number;

v) communicating, by the cloud server node, the primary phone number to the call-handling switch; and vi) delivering, by the call-handling switch, the outbound call to an external device, whereby the external device is given a caller-id set to the primary phone number instead of the secondary phone number, and b) during an inbound call from the external device with an external phone number;

i) generating an inbound audio signal at the external device;

ii) communicating, by the primary carrier system to the call-handling switch via a call forwarding setting of the primary mobile device, the inbound audio signal including a caller-id data signal associated with the external phone number of the external device;
iii) communicating, by the call-handling switch, the inbound audio signal to the cloud server node;
iv) converting, by the cloud server node, the caller-id data signal to an inbound DTMF signal;
v) communicating, by the cloud server node, the inbound DTMF signal to the call-handling switch; and
vi) delivering, by the call-handling switch, the inbound audio signal with the inbound DTMF signal to the secondary mobile device, whereby the second mobile device is given the external phone number associated with the external device.

\* \* \* \* \*